United States Patent [19]

Maser et al.

[11] Patent Number: 4,730,146
[45] Date of Patent: Mar. 8, 1988

[54] FOLDED ELECTROLUMINESCENT LAMP ASSEMBLY

[75] Inventors: Thomas L. Maser, Mequon; Kelly R. Davis, Milwaukee, both of Wis.

[73] Assignee: W. H. Brady Co., Milwaukee, Wis.

[21] Appl. No.: 921,714

[22] Filed: Oct. 21, 1986

[51] Int. Cl.$^4$ .............................................. B05D 5/12
[52] U.S. Cl. ................................... 313/511; 313/502; 313/503; 313/506; 313/509; 174/117 PC; 174/117 F; 174/117 A
[58] Field of Search ............... 313/498, 503, 506, 511, 313/512; 174/117 PC, 117 A, 117 F; 340/760, 719

[56] References Cited

U.S. PATENT DOCUMENTS

| | | | |
|---|---|---|---|
| 3,205,393 | 9/1965 | Mash | 313/108 |
| 3,315,111 | 4/1967 | Jaffe et al. | 313/108 |
| 4,028,509 | 6/1977 | Zurcher | 205/5 A |
| 4,066,851 | 1/1978 | White et al. | 205/5 A |
| 4,138,620 | 2/1979 | Dickson | 313/1 |
| 4,356,358 | 10/1982 | Fukukura | 205/5 A |
| 4,468,659 | 8/1984 | Ohba et al. | 340/719 |
| 4,513,023 | 4/1985 | Wary | 427/54.1 |
| 4,617,195 | 10/1986 | Mental | 313/503 X |
| 4,623,768 | 11/1986 | Gnant | 200/159 B |
| 4,626,742 | 12/1986 | Mental | 313/503 X |

Primary Examiner—David K. Moore
Assistant Examiner—Mark R. Powell
Attorney, Agent, or Firm—Quarles & Brady

[57] ABSTRACT

A folded electroluminescent lamp assembly (37,65, 87) including an electroluminescent lamp panel (10,41,74, 89) joined to a flexible circuit panel (4,42,73, 88) folded over and joined to the lamp panel. A tail (5,43,79, 90) extends from the circuit panel. Conductive tracks (30–35,56–58,78) extend across the circuit panel and the tail and are connected to the electrodes of the lamp panel. An electrical power source for activation of the electroluminescent lamp panel is to be connected to the tail (5,43,79, 90).

4 Claims, 8 Drawing Figures

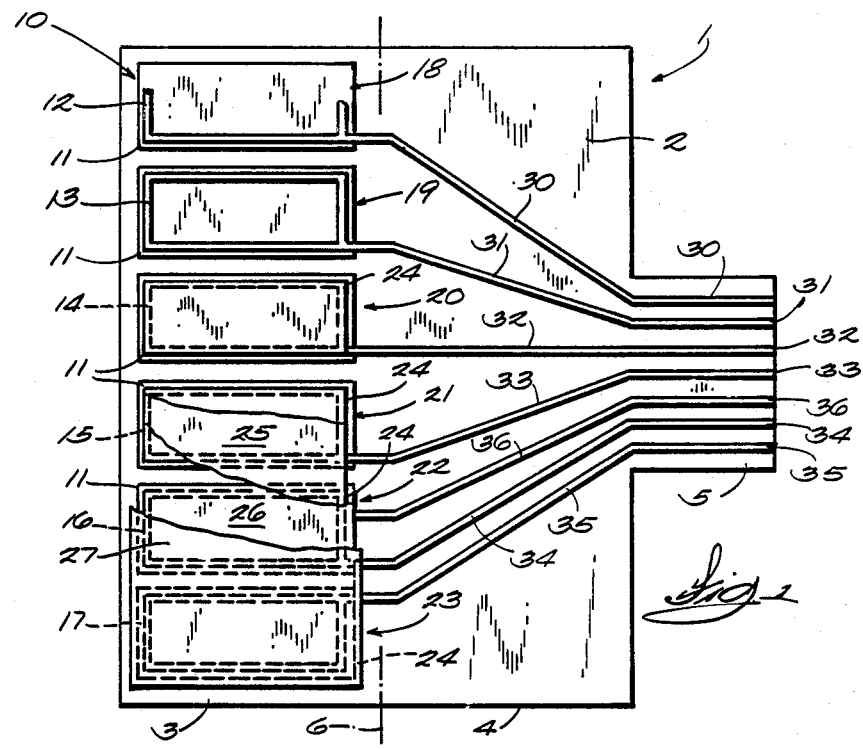
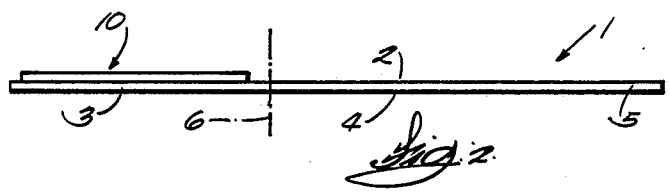
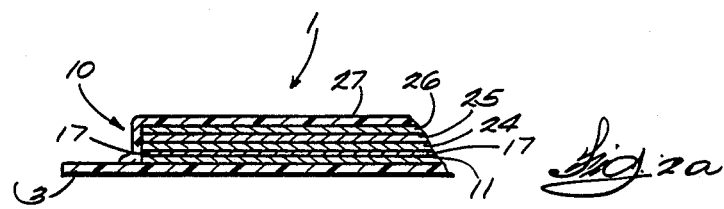
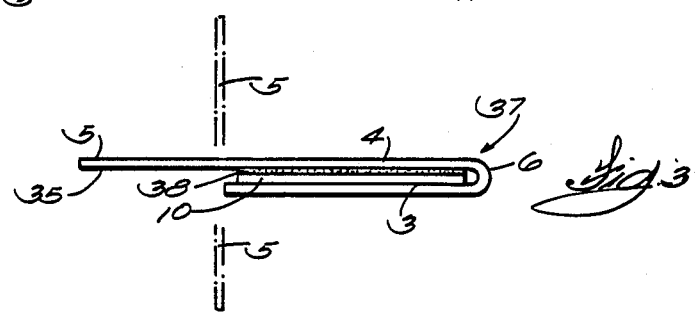

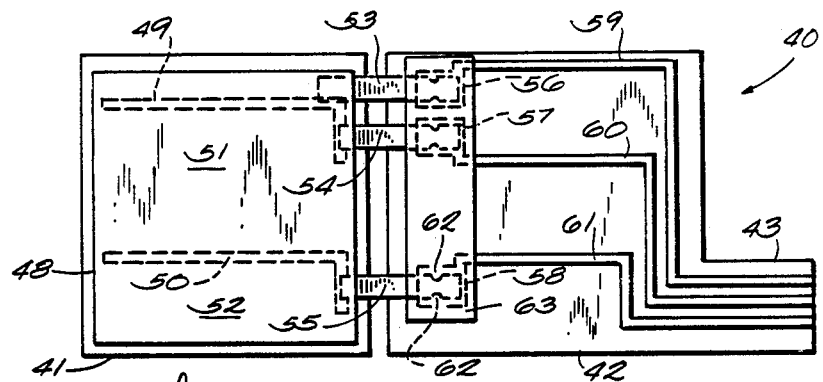
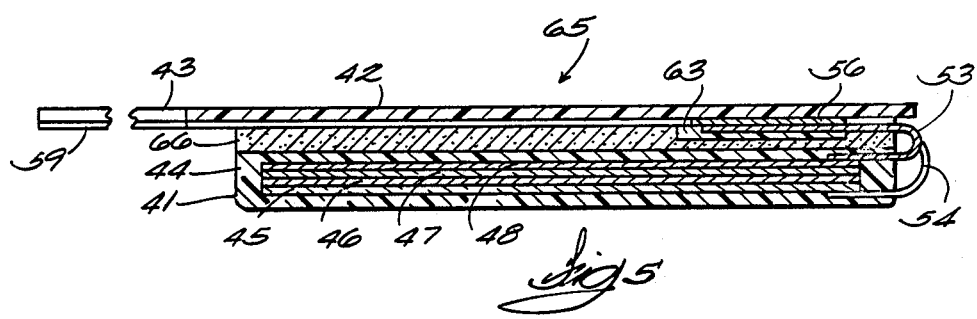
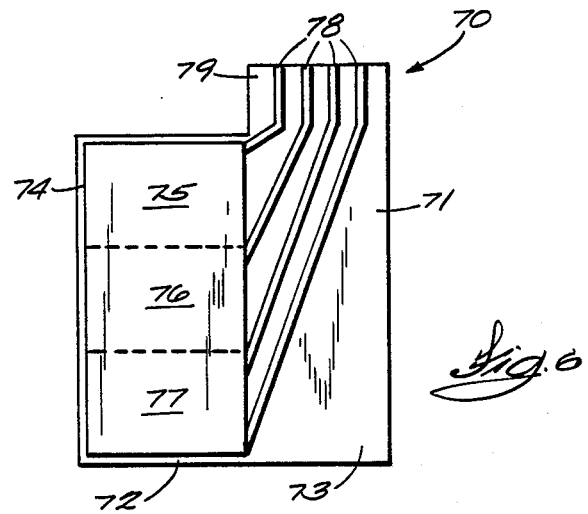

FOLDED ELECTROLUMINESCENT LAMP ASSEMBLY

TECHNICAL FIELD

This invention relates to the art of electrical assemblies including an electroluminescent lamp panel.

BACKGROUND

Electroluminescent lamp panels are well known in the art and comprise a base electrode spaced from a transparent electrode with a phosphorescent layer and a dielectric layer between the two electrodes. Conductive leads extend from the base and transparent electrodes for connection to an AC power source. Current induced between the base and transparent electrodes upon actuation causes the phosphorescent layer to emit light, a phenomenon known as luminescence, that is visible through the transparent electrode, and an electroluminescent lamp can be thought of as a light emitting capacitor. An electroluminescent lamp panel can include one or a plurality of individual electroluminescent lamps.

Two types of electroluminescent lamp panels are in general use, "foil" and "printed", Which terms refer to the nature of the base or non-transparent electrode. The base electrode in a "foil" electroluminescent lamp is a thin aluminum foil layer, whereas the base electrode in a "printed" electroluminescent lamp is a layer printed with conductive ink such as a silver conductive ink.

Electroluminescent lamp panels find substantial use with various types of equipment for which it is desired to provide one or more lighted areas such as for lighting a key pad or control panel. For example, key areas or graphic displays and the like of a membrane switch panel associated with a particular apparatus can be lit with one or more electroluminescent lamps.

SUMMARY OF THE INVENTION

Our present invention provides a novel folded assembly including an electroluminescent lamp panel and a flexible circuit panel of plastic film carrying conductive leads for activation of the lamp(s) of the electroluminescent lamp panel wherein the flexible circuit panel is folded over and joined to a surface of the electroluminescent lamp panel adjacent the base electrode of the lamp panel. A tail extends from the circuit panel for connecting the conductive leads to the lamp panel to an electrical power source for activation of the electroluminescent lamps. A printed electroluminescent lamp panel when used in the folded assembly is supported on a first portion of a plastic film substrate and a second portion of the substrate forms the circuit panel; the substrate is transparent so that light emitted through the transparent electrode of the lamp panel is visible through the substrate. A foil electroluminescent lamp panel when used in the folded assembly has metal leads joined to the flexible circuit panel and the circuit panel is folded over the lamp panel along the metal leads. Various advantages of our new construction are set forth following the detailed description of this invention.

DESCRIPTION OF THE DRAWINGS

The present invention is fully described hereinbelow by reference to the following drawings, in which:

FIG. 1 is a plan view of a first assembly suitable for the practice of the present invention;

FIG. 2 is a side view of the assembly of FIG. 1;

FIG. 2a is an enlarged partial sectional view of the assembly of FIG. 1;

FIG. 3 is a side view of the assembly of FIG. 1 in a folded condition according to this invention;

FIG. 4 is a plan view of a second assembly suitable for the practice of this invention;

FIG. 5 is a sectional view of the assembly of FIG. 4 after being folded in accordance with the present invention;

FIG. 6 is a plan view of another assembly suitable for the practice of this invention.

BEST MODES FOR CARRYING OUT THE INVENTION

Figure 7:
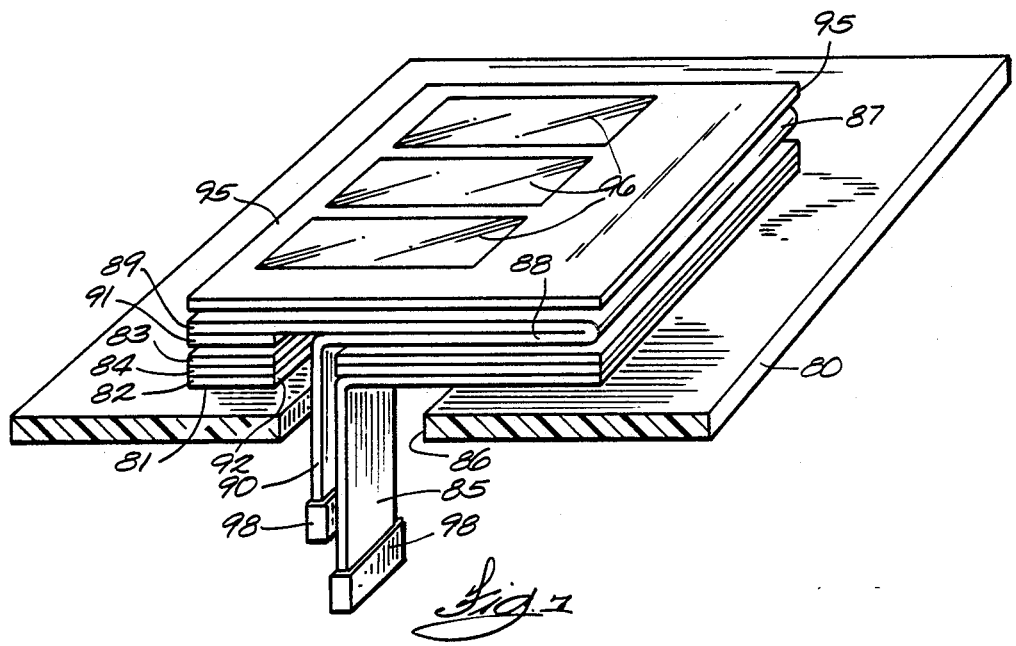
FIG. 7 is an exploded perspective view of a typical installation of a folded assembly of this invention.

In the following description, the word "electroluminescent" is often abbreviated as EL.

FIGS. 1-3 illustrate a first flat assembly 1 suitable for the practice of the present invention. The assembly 1 includes a substrate 2 of flexible plastic film diecut to a configuration including a first portion 3 integral with and joined to a second portion 4 and a tail 5 extending from an edge of second portion 4. The substrate 2 is made of a transparent flexible plastic film that is foldable along a folding zone 6 between the first and second portions, which is indicated by a dashed line. For most uses of the assembly 1, the substrate 2 can be a plastic film about 0.005 to 0.010 inch (about 0.125–0.250 mm) thick, although films of greater or lesser thickness can also be employed.

First portion 3 of substrate 2 supports a EL lamp panel 10 illustrated as a printed EL lamp panel in this first embodiment. FIG. 1 depicts the several layers of EL lamp panel 10 successively broken away to better illustrate and describe its construction, and FIG. 2a shows lamp panel 10 in section on an enlarged scale. Referring now to these two drawings, printed EL lamp panel 10 consists of the following layers applied one over the other on the substrate 2:

(a) The lowermost layer of the lamp panel is a transparent conductive layer 11 applied onto a surface of the first portion of the substrate 2 as a coating in the form of a plurality of discrete rectangles of the size selected for the individual lamps of the panel 10; also, however, layer 11 can be a single rectangular layer large enough to cover all the individual lamps of panel 10. Layer 11 is to be a transparent coating of a conductive material, for example indium tin oxide in a suitable binder or a vacuum deposited layer of indium tin oxide, capable of functioning as the transparent electrode of the lamp panel 10.

(b) A set of six bus bars 12, 13, 14, 16, 17 are printed onto the conductive layer 11, there being one bus bar in the shape of a rectangular frame as shown in FIG. 1 on each rectangular segment of the layer 11. The bus bars 12-17 divide EL lamp panel into six separate EL lamps 18, 19, 20, 21, 22 and 23. Only part of bus bar 12 is shown in FIG. 1 so as to expose the underlying rectangle of conductive layer 11, with bus bars 13-17 being shown in their entirety. Bus bars 12-17 are printed onto the conductive layer 11 with a conductive ink.

(c) A set of six phosphorescent layers 24 in the form of a rectangle are printed over each bus bar, it being understood that a phosphorescent layer 24 will also be over bus bars 12 and 13. Any suitable phosphorescent material can be used for the layers 24; various compositions are known in the art such as for example zinc sulfide doped with manganese oxide or copper in a dielectric binder.

(d) A dielectric layer 25 is applied over all the phosphorescent layers 24 as a single large rectangular layer covering all of the EL lamps 18–23. Any appropriate composition can be used for the layer 24 and various types are known in the art such, for example, cyanoethylated cellulose mixed with barium titanate.

(e) Next, a base electrode 26 is applied over the dielectric layer 25 as a large rectangular coating of the same size as the dielectric layer. Base electrode 26 is printed over the dielectric layer with a conductive ink.

(f) The last element of printed EL panel 10 in the exemplary first embodiment is an insulating top layer 27 which may comprise a thin film, about 0.001 to 0.002 inch (about 0.025–0.05 mm) thick of nonconductive plastic film. Insulating top layer 27 is slightly larger than the other elements of lamp panel 10 and is secured to the substrate 2 around the perimeter of the lamp panel so as to completely enclose and seal the elements of the lamp panel.

It should be noted that the layers 11–27 of EL lamp panel 10 are each very thin layers, especially printed layers 11–26, so that the total thickness of the panel 10 is generally in the range of only about 0.009 to 0.014 inch (about 0.2–1.6 mm thick). EL lamp panel 10 is of conventional construction and several types of printed EL lamp panels are known in the art and commercially available.

Conductive lead 30 extends from bus bar 12 across second portion 4 of the substrate 2 and along tail 5 to the free end thereof. In the same manner, conductive leads 31, 32, 33, 34 and 35 extend from bus bars 13, 14, 15, 16 and 17, respectively, across second portion 4 to the end of tail 5. Conductive lead 36 extends from base electrode 26 of the EL lamp panel 10 across second portion 4 to the end of the tail 5. Conductive leads 30–36 can be applied to the substrate 2 by printing with a conductive ink.

It can be seen from the above description that first portion 3 of substrate 2 supports the EL lamp panel 10 and the second portion 4 of the substrate carries the conductive leads from the panel that are to be connected to an external power source for activation of the lamps of the lamp panel 10.

FIG. 3 illustrates a folded EL lamp assembly 37 according to the present invention as produced with the assembly 1 of FIGS. 1 and 2. Second portion 4 of substrate 2 is folded along folding zone 6 over first portion 3 of the substrate and its inner surface is joined to the EL lamp panel 10 by means of an adhesive layer 38. The adhesive layer 38 may comprise any suitable adhesive, such as pressure sensitive adhesive, thermally activated adhesive, etc., appropriate to the particular materials used for the substrate and the EL panel. The tail 5 may extend from one side of the folded assembly as shown in solid line in FIG. 3 or can extend perpendicular to the folded assembly as shown in dashed lines in FIG. 3 and a suitable connector, not shown, is applied to the end of tail 5 to connect a suitable AC power source, also not shown, to the conductive leads 30–36 for activation of the lamps 18–23 of EL lamp panel 10. As noted previously, the substrate 2, including its first portion 3 is transparent. Activation of one or more of the EL lamps will cause light to be transmitted through conductive layer 11, which is the transparent electrode of the lamp panel, and through the transparent first portion 3 of the substrate since the conductive layer 11 is along the interior surface of first portion 3.

FIG. 4 illustrates a flat assembly 40 suitable for forming into a second embodiment of the present invention. The assembly 40 includes a foil EL lamp 41 joined to a circuit panel 42 of flexible plastic film. Tail 43 extends from one edge of panel 42. Referring briefly to the sectional view of FIG. 5, the several elements of EL panel 10 include an exterior transparent envelope 44 of insulating plastic material that surrounds all surfaces of the EL panel to seal and insulate its various elements, a transparent electrode 45 inside envelope 44, a phosphorescent layer 46 disposed over the transparent electrode, a dielectric layer 47 over the phosphorescent layer, and a base electrode 48 over the dielectric layer. Returning now to FIG. 4, L-shaped bus bars 49 and 50 are in electrical contact with transparent electrode 45 and divide the EL panel 41 into two separate EL lamps 51 and 52. Metal lead 53 is connected to base electrode 48 of the EL panel and extends through the outer transparent envelope 44; metal leads 54 and 55 are connected, respectively, to bus bars 49 and 50 and also extend through the transparent envelope 44. The base electrode is common to both lamps 51 and 52, whereas bus bars 49 and 50 are unique to lamps 51 and 52 respectively.

Circuit panel 42 includes a conductive pattern on its upper surface as visible in FIG. 4 comprising conductive pads 56, 57 and 58, conductive lead 59 extending from pad 56 to the end of tail 43, conductive lead 60 extending from pad 57 to the end of tail 43 and conductive lead 61 extending from pad 58 to the end of tail 43. The conductive pads and conductive leads can be applied to the surface of panel 42 by printing with conductive ink.

EL panel 41 is arranged relative to circuit panel 42 with each of its metal leads in electrical contact with one of the conductive pads on panel 42. Thus, metal lead 53 of the EL panel is electrically in contact with conductive pad 56, lead 54 is in electrical contact with pad 57 and lead 55 is in electrical contact with pad 58. Further, the metal leads 53–55 of the EL panel 41 are to be joined to circuit panel 42. Preferably, and as illustrated in FIG. 4, the joinder of the EL panel to the circuit panel is in accordance with co-pending patent application entitled Electroluminescent Lamp Panel Combined With Flexible Circuit Panel filed on even date herewith and assigned to the assignee of this application, in the name of Kelly R. Davis as inventor, Ser. No. 921,649. In accordance with the invention of said application, each metal lead 53–55 includes a notch 62 extending into the lead along both of its side edges. A sealing strip 63 is applied over the metal leads and over panel 42 and thermally bonded to the panel 42 inside the notches 62 to thereby mechanically join EL panel 41 to circuit panel 42 and maintain leads 53–55 of panel 41 in good electrical contact with conductive pads 56–58 of panel 42. The aforesaid application is herein incorporated by reference for further details of this particular method of joining the EL panel to the flexible circuit layer.

Turning now to FIG. 5, a folded assembly 65 of the present invention is made from the assembly 40 of FIG. 4 by folding assembly 40 along metal leads 53-55 so that flexible circuit panel 42 overlies EL panel 41. Circuit panel 42 is then joined to the EL panel 41 by means of a layer of adhesive 66, which may comprise pressure sensitive adhesive, thermally activated adhesive, or any other appropriate adhesive. As with the first embodiment 37 of this invention, connections to an external AC power source for activation of the lamps 51 and 52 of EL panel 41 are made by connections to the tail 43 of folded assembly 65 and the tail may be coplanar with or perpendicular to the EL panel.

FIG. 6 illustrates a third version of a flat assembly suitable for the practice of this invention comprising an assembly 70 similar in construction to assembly 1 first described hereinabove including a substrate 71 with a first portion 72 and second portion 73. EL lamp panel 74 is formed on first portion 71 and includes a base electrode and three bus bars to define three individual EL lamps 75, 76 and 77. EL lamp panel 74 is a printed EL lamp panel of the same construction as EL lamp panel 10 previously described. Conductive tracks 78 extend from the bus bars and base electrode of panel 74 across second portion 73 of the substrate to the end of tail 79 that extends from an end marginal portion of second portion 73 of the substrate; this is in comparison to tail 5 extending from an edge marginal portion of the substrate as shown in FIG. 1. The second portion 73 of substrate 71 is folded over and joined to EL lamp panel 74 in the same manner described previously with respect to folded assembly 37 as illustrated in FIG. 3.

In the assemblies described above, the substrates 2 and 70 and circuit panel 42 can be made of any non-conductive flexible plastic film suitable for flexible circuitry. Polyester films, such as polyethylene terephthalate films, are the most commonly used materials. Polycarbonate films, polyimide films, nylon films and polysulfone films also can be used, as well as others such as polyolefin and polyvinyl chloride films. The plastic film material selected for these elements can be in the range of about 0.002-0.020 inches (0.025-0.50 mm) thick, or thicker if so desired, with 0.005 inch (0.125 mm) thick films being generally appropriate for most applications. Many types of conductive inks suitable for printing various elements of the EL panels and conductive leads or conductive pads on the plastic films are well known in the art and commercially available, which comprise a conductive metal such as carbon, silver, gold, copper, etc. in a suitable binder. Also, however, the conductive elements can be applied to the surfaces of plastic film elements by vacuum deposition of indium tin oxide or other appropriate conductive metal onto the plastic film.

FIG. 7 is a perspective view, exploded with thicknesses greatly exaggerated for clarity of description, illustrating a typical installation of a folded assembly of this invention. A portion of a wall 80 of any selected apparatus is shown in FIG. 7 on which is supported a membrane switch 81 comprising a first circuit layer 82 and second circuit layer 83 separated from one another by a spacer layer 84. A tail 85 extends from the membrane switch perpendicular to the circuit layers and passes through a slot 86 defined in the wall 80. Membrane switch 81 is of known construction and the facing surfaces of circuit layers 82 and 83 carry conductive patterns defining switch cells that are connected to external electronic circuitry by means of tail 85 to activate lamps of a folded El panel-circuit panel assembly 87 according to the present invention which is joined to the top of the membrane switch. The folded assembly 87 is of a construction similar to the assemblies 37 and 65 and the assembly 70 folded as previously described except that circuit panel 88 of the assembly 87 is shorter than EL panel 89 thereof so that tail 90 can be folded down perpendicular to the EL panel within the perimeter of the panel as illustrated in FIG. 7. A spacer 91 is joined to the EL panel 89 to substantially fill the area of panel 89 not covered by circuit panel 88. The tail 90 of folded assembly 87 extends downwardly through a slot 92 defined in membrane switch 81 and then extends through slot 86 of the wall 80. A face plate 95 is joined over the exterior surface of the folded assembly 87. The face plate 95 in the exemplary embodiment is a sheet of transparent plastic film that is printed with an overall color except for a plurality of windows 96 which are transparent and overlie individual EL lamps of the assembly 87 so that light from the lamps will be visible through the windows 96 when a particular lamp is activated. The tail 85 of the membrane switch and the tail 90 of the assembly 87 including the EL lamp and circuit panels are connected to appropriate external circuitry by connectors 98 at their ends, which can be any typically used connector such as a Berg Series 65801 connector.

The new folded EL lamp panel-flexible circuit panel assemblies described above provide a number of significant advantages to both the designers of circuits incorporating electroluminescent lamp panels and the users of such equipment. Among the numerous advantages associated with the present invention is that the novel folded construction allows the tail of a circuit panel to extend from an edge or end portion in a manner which is not possible with prior art constructions without oversizing the panel due to space limitations between the edge of the panel and the lamp borders. Thus the tail, which is utilized for connecting external circuitry to the EL panel, can be arranged in locations within a confined space which are not achievable with the non-folded EL panel and circuit panel constructions as previously known. Further in connection with the tail location, our new construction has another advantage in that the tail can exit from the EL panel within the perimeter of the panel, and the assembly can be made with the tail extending behind the lighted area of the EL panel. Another significant advantage is that the present construction permits a very high unit density of EL lamp areas within a limited panel area. A compact EL panel and circuit panel package can thereby be provided for end users of the product. Another important advantage is that there is greater design flexibility possible with the present construction than with the prior art constructions typically found with EL panels. The present construction also offers a designer wider latitude with respect to customizing the circuitry pinouts from the EL panel. Of additional importance is the fact that these and other advantages can be provided at lower costs than associated with prior art constructions.

The present invention has been described hereinabove by reference to certain specific embodiments to fully and clearly set forth the details of its features. However, it is to be understood that various changes and modifications can be made to the exemplary constructions that will remain within the true spirit and scope of this invention as reflected in the appended claims.

We claim:

1. In combination with an electroluminescent lamp panel haivng a base electrode, a transparent electrode spaced from the base electrode, a conductive lead electrically connected to the base electrode, and one or more conductive leads electrically connected to the transparent electrode to define one or more electroluminescent lamps, the improvement comprising:

a circuit panel of flexible plastic film joined to the electroluminesce lamp panel;

a tail of flexible plastic film extending from a marginal portion of the circuit panel;

conductive tracks extending across the circuit panel and across the tail to a free end thereof, the conductive tracks being electrically connected to the aforesaid conductive leads to the base and transparent electrodes of the electroluminescent lamp panel;

the circuit panel overlying and adhered to the electroluminescent lamp panel along a surface of the lamp panel adjacent the base electrode to define a folded assembly including the conductive tracks along an interior surface of the circuit panel; and the tail extending from the folded assembly for connection to an electrical power source for activation of each lamp of the electroluminescent lamp panel.

2. A folded electroluminescent lamp assembly according to claim 1, wherein:

the circuit panel comprises a first portion of a substrate sheet of flexible plastic film;

the electroluminescent lamp panel is on a second portion of the substrate sheet integral with the first portion;

the tail comprises another integral portion of the substrate sheet; and the substrate sheet is transparent and the transparent electrode of the electroluminescent lamp panel is adjacent a surface thereof whereby light emitted by the lamp panel is visable through the substrate sheet.

3. A folded electroluminescent lamp assembly according to claim 2, wherein:

the lamp panel is a printed electroluminescent lamp panel including successive coatings applied to the substrate sheet to define, in sequence, a transparent conductive layer, a conductive bus bar, a phosphorescent layer, a dielectric layer, a base electrode and an insulating top layer for each electroluminescent lamp in said panel.

4. A folded electroluminescent lamp assembly according to claim 1, wherein:

the lamp panel is a foil electroluminescent lamp panel including metal leads electrically connected to and extending from the base and transparent electrodes, the metal leads are joined to the circuit panel, and the assembly is folded along the metal leads to position the circuit panel along a surface of the lamp panel adjacent the base electrode thereof to define the folded assembly.

* * * * *